United States Patent
Kurz et al.

(10) Patent No.: US 10,005,485 B2
(45) Date of Patent: Jun. 26, 2018

(54) STEERING COLUMN FOR A MOTOR VEHICLE

(71) Applicants: ThyssenKrupp Presta AG, Eschen (LI); ThyssenKrupp AG, Essen (DE)

(72) Inventors: Hannes Kurz, Feldkirch (AT); Emanuel Schiele, Frastanz (AT); Werner Adelmann, Sennwald (CH); Matthias Nicolussi, Feldkirch (AT); Karl Mathias Hehle, Höbranz (AT)

(73) Assignees: THYSSENKRUPP PRESTA AG, Eschen (DE); THYSSENKRUPP AG, Essen (DE)

( * ) Notice: Subject to any disclaimer, the term of this patent is extended or adjusted under 35 U.S.C. 154(b) by 18 days.

(21) Appl. No.: 15/503,820

(22) PCT Filed: Aug. 5, 2015

(86) PCT No.: PCT/EP2015/068093
§ 371 (c)(1),
(2) Date: Feb. 14, 2017

(87) PCT Pub. No.: WO2016/023806
PCT Pub. Date: Feb. 18, 2016

(65) Prior Publication Data
US 2017/0282958 A1    Oct. 5, 2017

(30) Foreign Application Priority Data
Aug. 14, 2014 (DE) .................. 10 2014 111 606

(51) Int. Cl.
*B62D 1/184* (2006.01)
*B62D 1/185* (2006.01)
*B62D 1/187* (2006.01)

(52) U.S. Cl.
CPC ............. *B62D 1/184* (2013.01); *B62D 1/185* (2013.01); *B62D 1/187* (2013.01)

(58) Field of Classification Search
CPC ......... B62D 1/184; B62D 1/185; B62D 1/187
See application file for complete search history.

(56) References Cited

U.S. PATENT DOCUMENTS 5,722,299 A * 3/1998 Yamamoto ............. B62D 1/184
                                                    280/775
5,743,150 A * 4/1998 Fevre ..................... B62D 1/184
                                                    280/775
(Continued)

FOREIGN PATENT DOCUMENTS

DE    102007003091 B3    8/2008
GB       2352284 A       1/2001

OTHER PUBLICATIONS

Int'l Search Report for PCT/EP2015/068093 (dated Nov. 3, 2015).

*Primary Examiner* — Drew J Brown
(74) *Attorney, Agent, or Firm* — thyssenkrupp North America, Inc.

(57) ABSTRACT

A steering column for a motor vehicle may include a holding element that is securable on a chassis of the motor vehicle, an adjustment element that is adjustable relative to the holding element and is configured to receive a steering shaft, and a locking device for locking the adjustment element relative to the holding element. The locking device may include a clamping lever that is movable between a locking position where the adjustment element is locked with respect to the holding element and an open position where the adjustment element is adjustable with respect to the holding element. The steering column may further include a retaining element that provides a form-fitting connection between the holding element and the adjustment element in the locking position of the clamping lever. The retaining ele- (Continued)

ment may include a slotted guide contour, which in the locking position of the clamping lever, is supported on a contact section of the clamping lever.

20 Claims, 2 Drawing Sheets

(56) References Cited

U.S. PATENT DOCUMENTS

| | | | | |
|---|---|---|---|---|
| 8,006,587 B2* | 8/2011 | Schnitzer | ............... | B62D 1/184 |
| | | | | 74/493 |
| 8,413,541 B2* | 4/2013 | Davies | ................... | B62D 1/184 |
| | | | | 280/777 |
| 9,469,330 B2* | 10/2016 | Tanaka | ................... | B62D 1/184 |
| 9,604,663 B2* | 3/2017 | Tomiyama | ............. | B62D 1/184 |
| 2004/0261565 A1* | 12/2004 | Uphaus | ................. | B62D 1/184 |
| | | | | 74/493 |
| 2006/0090586 A1* | 5/2006 | Lee | ........................ | B62D 1/184 |
| | | | | 74/492 |
| 2013/0298719 A1* | 11/2013 | Schnitzer | ............... | B62D 1/184 |
| | | | | 74/493 |
| 2017/0282957 A1* | 10/2017 | Matsuno | ................ | B62D 1/187 |
| 2017/0282960 A1* | 10/2017 | Matsuno | ................ | B62D 1/189 |
| 2018/0050719 A1* | 2/2018 | Agbor | ................... | B62D 1/184 |

* cited by examiner

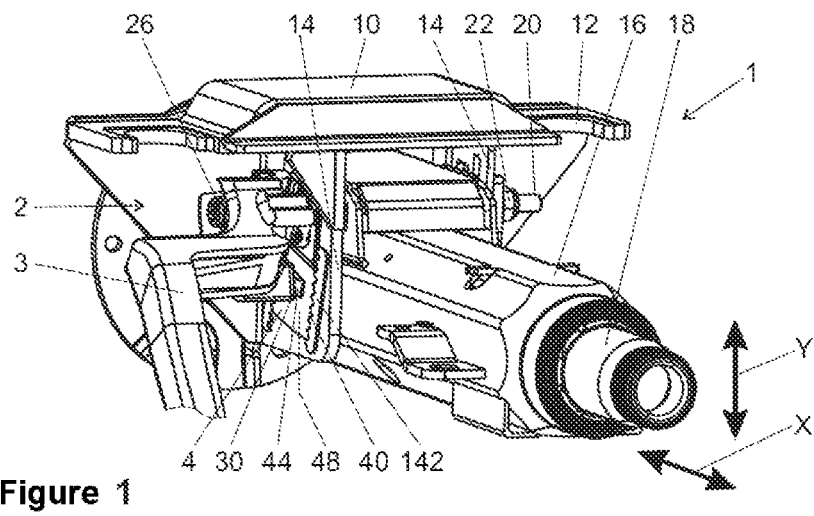
Figure 1
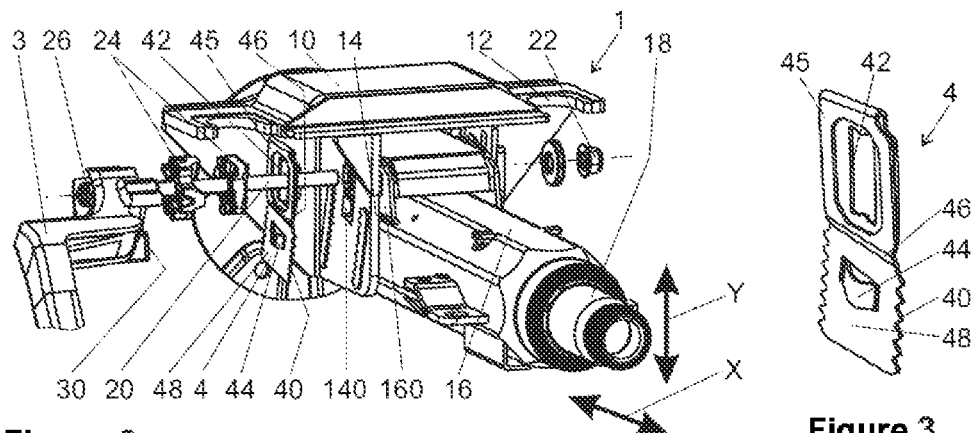
Figure 2
Figure 3
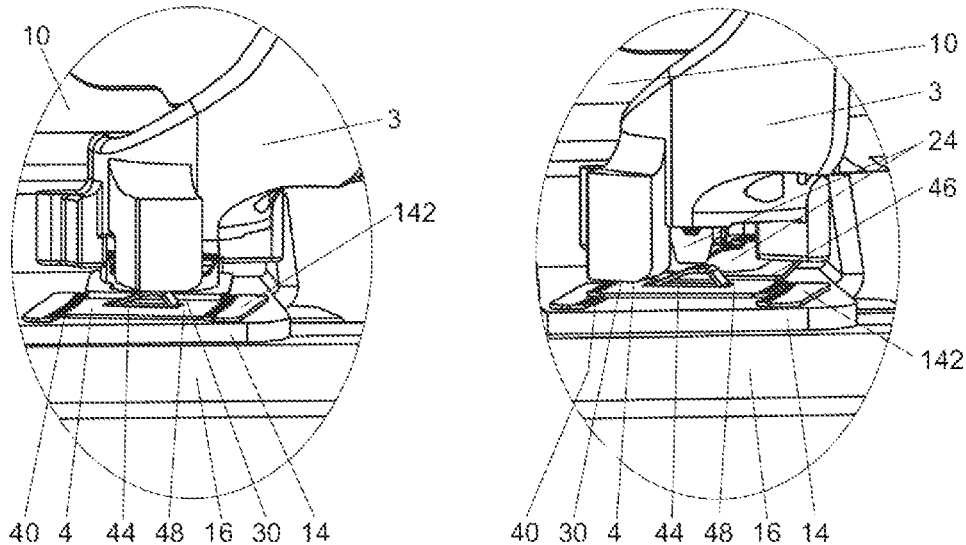
Figure 4
Figure 5

STEERING COLUMN FOR A MOTOR VEHICLE

CROSS REFERENCE TO RELATED APPLICATIONS

This application is a U.S. National Stage Entry of International Patent Application Ser. No. PCT/EP2015/068093, filed Aug. 5, 2015, which claims priority to German Patent Application No. DE 10 2014 111 606.2 filed Aug. 14, 2014, the entire contents of both of which are incorporated herein by reference.

FIELD

The present disclosure generally concerns steering columns that permit adjustment of a position of a steering wheel relative to a chassis of a motor vehicle, including height adjustment of the steering wheel to optimize the steering wheel position for any driver.

BACKGROUND

The prior art discloses steering columns which allow adjustment of the position of the steering wheel with respect to the chassis of the vehicle. Such position adjustment of the steering wheel makes it possible for the driver to set the optimum steering wheel position for the respective driver in order thereby to improve the ergonomics of driving and in this way enhance safety when driving the motor vehicle.

Known steering columns for motor vehicles comprise a holding element, e.g. a bracket, which is fixed on the chassis of the motor vehicle. Held on the bracket is an adjustment element, the position of which relative to the bracket can be adjusted in a predetermined range and in which the steering shaft is rotatably mounted in a known manner. Through adjustment of the position of the adjustment element in relation to the holding element, it is accordingly possible to achieve position adjustment of the steering wheel held on the steering shaft. In this case, it is a known practice for the adjustment element to be adjustable in the axial direction of the steering shaft in order correspondingly to perform longitudinal adjustment of the steering wheel position and to perform height adjustment of the adjustment element in relation to the holding element in order to perform height adjustment of the steering wheel.

In this case, the height adjustment of the steering wheel is often carried out in such a way that, on the side thereof facing away from the driver, the adjustment element is held on a pivot, about which the front part of the adjustment element can then be pivoted in order correspondingly to perform the height adjustment of the steering wheel.

It is a known practice to define the possible adjusting movements by means of a locking device in such a way that the steering wheel position remains invariable while driving and that it is possible, even when relatively high forces are introduced, such as those which are introduced when entering and alighting if the driver supports himself on the steering wheel, for example, to maintain the position in such a way that no adjustment of the adjustment element in relation to the holding element takes place.

In the event of a crash, a steering wheel is usually displaceable in an axial direction in order to be able to absorb some of the energy of the crash by deformation of a crash element, for example, if the driver strikes the steering wheel. In this way, the steering wheel is simultaneously moved out of the danger zone.

In order to avoid hindering the action of a crash mechanism known per se for longitudinal adjustment of the steering column, it is necessary for the horizontal position of the steering wheel to be substantially retained in the event of a crash. In particular, a situation in which the steering wheel rears upward in the event of a crash should be avoided.

In order to prevent such rearing of the steering wheel, the prior art discloses retaining elements comprising form-fitting elements in the form of tooth systems, which provide a form-fitting connection between the holding element and the adjustment element when the locking device is locked.

An adjustable steering column comprising a retaining element of this kind is known from DE 10 2007 003 091 B3, for example. In this case, a retaining element in the form of a toothed strip is pressed into the locking position by means of the stroke provided by a tightening pin, also referred to as a clamping pin, of the locking device. In particular, the toothed strip can be brought into engagement with toothing on the bracket side cheek by the axial movement as the steering column is locked. To ensure reliable engagement of the toothing while, on the other hand, allowing snag-free adjustment of the adjustment element in relation to the holding element in the open position, a large stroke of the clamping system is necessary, which, for its part, can result in a large lever operating angle.

In GB 2 352 284 A there is a description of a steering column comprising a retaining element which likewise comprises toothing that can be brought into engagement with toothing on the bracket side cheek as the locking device is locked. However, unlike that in the abovementioned DE 10 2007 003 091 B3, this is not brought into engagement by an axial movement in the direction of extent of the clamping pin brought about by the stroke of the locking device but is brought into engagement transversely thereto in a radial direction.

BRIEF DESCRIPTION OF THE FIGURES

FIG. 1 is a schematic perspective view of an example steering column for a motor vehicle wherein a locking device is in a locked position.

FIG. 2 is a schematic perspective view of the example steering column of FIG. 1 with a partially-disassembled locking device.

FIG. 3 is a schematic perspective view of an example locking element.

FIG. 4 is a schematic perspective detail view of interaction of an example clamping lever with an example retaining element in a locking position.

FIG. 5 is a schematic perspective view of a detail of an example locking device with an example clamping lever and an example retaining element in an open position.

DETAILED DESCRIPTION

Figure 6:
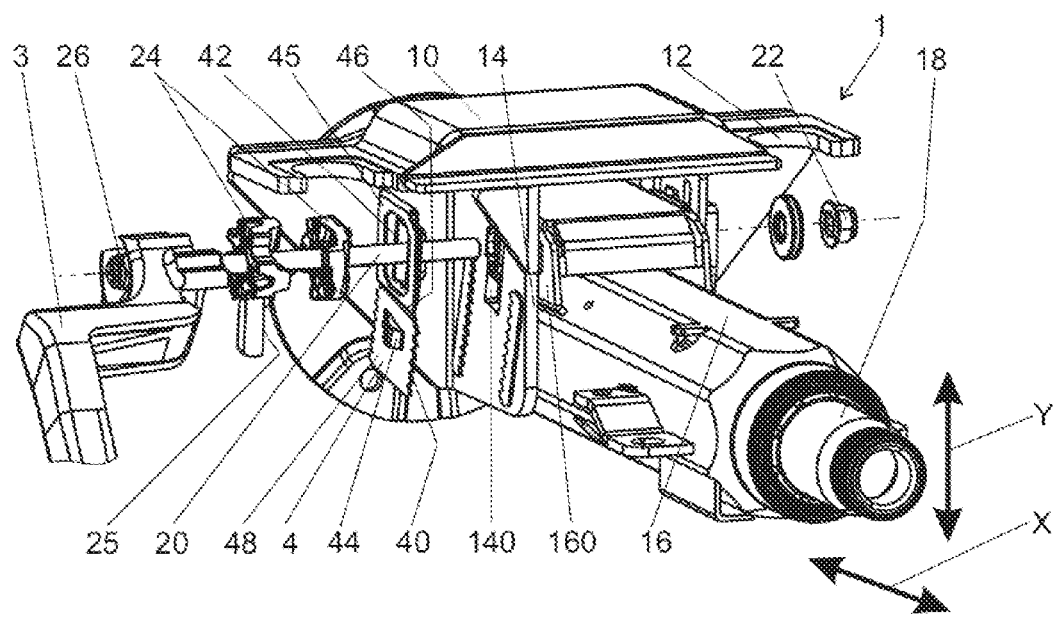
FIG. 6 is a schematic perspective view of another example steering column with a partially-disassembled locking device similar to that of FIG. 2.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

Proceeding from the prior art known from DE 10 2007 003 091 B3, it is an object of the present invention to specify a steering column for a motor vehicle which provides retention of the steering column that is independent of the stroke of the locking device.

Accordingly, the proposal is for a steering column for a motor vehicle, comprising a holding element, which can be secured on the chassis of the motor vehicle, an adjustment element, which is adjustable in relation to the holding element, for receiving a steering shaft, and a locking device for locking the adjustment element in relation to the holding element, wherein the locking device comprises a clamping lever, which is movable between a locking position, in which the adjustment element is locked with respect to the holding element, and an open position, in which the adjustment element is adjustable with respect to the holding element. Furthermore, a retaining element is provided, which retaining element provides a form-fitting connection between the holding element and the adjustment element in the locking position of the clamping lever. According to the invention, the retaining element comprises a slotted guide contour, which, in the locking position of the clamping lever, is supported against the stroke of the locking device on a contact section of the clamping lever or on a contact section connected for conjoint rotation to the clamping lever.

As in the prior art taken as a basis in defining the type in question, pivoting the clamping lever leads to rotation of the clamping pin connected for conjoint rotation thereto, bringing about a stroke of the locking device in the direction of extent of the clamping pin, i.e. a stroke in an axial direction in respect of the clamping pin. According to the invention, the retaining element is supported against this clamping stroke on the contact section by means of the slotted guide contour in an axial direction. As a result, the retaining element is moved into the form-fitting position in an axial direction, i.e. in the direction of extent of the clamping pin, as the locking device is locked.

Providing the retaining element in such a way that it comprises a slotted guide contour which is supported on a contact section of the clamping lever in the locking position of the clamping lever ensures that the locking or preloading of the retaining element into the form-fitting position is independent of the stroke of the locking device.

On the contrary, the retaining element or the slotted guide contour thereof comes into direct contact with the clamping lever or the contact section thereof, and therefore preloading of the retaining element is provided exclusively by the direct contact of the clamping lever with the retaining element. The retaining element is thereby preloaded to provide the form-fitting connection.

Here, the stroke provided by the locking device is secondary, and the retaining element is preloaded into its locked state providing the form-fitting connection solely by the movement of the clamping lever from the open position into the locking position. Accordingly, the movement of the clamping lever can also be a small movement, thus allowing the locking device to be actuated even with a small stroke, which is sufficient to provide a nonpositive connection between the holding element and the adjustment element. During the actuation of the locking device, the retaining element is moved in the direction of the stroke, which corresponds to the axial direction of the clamping pin.

In this way, it is furthermore made possible for the locking device to be designed with a small stroke overall since the engagement or disengagement of the retaining element from the form-fitting connection thereof between the holding element and the adjustment element, e.g. mating toothing, does not have to go beyond this stroke. Accordingly, jamming of the adjustment element in relation to the holding element can be released even in the case of a small stroke of the locking device, thus ensuring that snag-free adjustment of the adjustment element in relation to the holding element is nevertheless possible.

This can also be promoted if the retaining element or the slotted guide contour thereof comes into contact with the corresponding contact section of the clamping lever only in the final region of the pivoting angle before the complete locking of the clamping lever. In the other positions of the clamping lever, the slotted guide contour is accordingly not in contact with the contact section of the clamping lever, and therefore the retaining element is free. This ensures that the retaining element can be moved reliably out of engagement with the corresponding form-fitting connection, e.g. the mating toothing.

The slotted guide contour is preferably designed in such a way that the retaining element is preloaded to produce or provide the form-fitting connection by the contact with the contact section of the clamping lever. In this way, it is possible to achieve reliable engagement of the form-fitting elements, even if there is a tooth-on-tooth situation during the locking of the locking device. By means of the preloading, reliable production of the form-fitting connection can then be achieved as soon as there is even a slight movement of the adjustment element in relation to the holding element, since the form-fitting elements then enter directly into contact with one another.

To provide the preloading and in order to move the retaining element from an open position into a form-fitting position through the contact with the contact section of the clamping lever, the slotted guide contour is preferably of ramp-shaped design.

In order to be able to provide a reliable form-fitting connection, the retaining element preferably comprises a toothing, which can be brought into engagement with mating toothing on the holding element to form the form-fitting connection.

In a preferred development, the retaining element comprises an attachment section, by means of which it is attached to the adjustment element, wherein the attachment section particularly preferably comprises an aperture, which is penetrated by a clamping pin for applying a clamping force in the locking position of the clamping lever. Through the provision of the attachment section, the retaining element is held on the adjustment element and moves together with the latter in at least one direction of adjustment. If a form-fitting connection takes place between the retaining element and the holding element, a form-fitting connection is also formed between the holding element and the adjustment element by means of the retaining element.

The retaining element preferably comprises a locking section which accommodates a form-fitting element, particularly preferably a toothing, which locking section comprises the slotted guide contour and which is connected by means of a springy section, particularly preferably in an integral manner, to a retaining-element attachment section attached to the adjustment element. In this way, the locking section is connected to the attachment section by a springy section, thus allowing the locking section to be preloaded out of the form-fitting position independently of the attachment section.

In a preferred development, the locking device comprises a clamping mechanism, particularly preferably a mechanism that comprises wedging disks or a cam mechanism, which mechanism acts on an attachment section of the retaining element. A locking section of the retaining element is preloaded independently of the clamping mechanism by means of the contact of the contact section of the clamping lever with the slotted guide contour in order to produce the form-fitting connection. Accordingly, there is decoupling between the locking of the adjustment element in relation to the holding element by means of the locking device, e.g. by means of clamping, and preloading of the retaining element into the form-fitting position. Accordingly, the movement of the retaining element into the form-fitting position is independent of the locking of the locking device and, in particular, independent of the clamping stroke of the locking device which the latter provides to lock the adjustment element in relation to the holding element.

The retaining element preferably comprises a springy section, which reliably ensures that the retaining element is pushed out of or released from the corresponding mating toothing whenever the clamping lever is not in contact with the slotted guide contour of the retaining element. By means of the springy section, the retaining element is accordingly preloaded out of the form-fitting position thereof, in which it is in engagement with the mating toothing, in such a way that it is possible to ensure that problem-free adjustment of the adjustment element in relation to the holding element can be achieved in the open position.

Accordingly, the steering column is independent of the (clamping) stroke of the locking device and of the clamping system of the locking device since the actuation of the retaining element is performed by the locking lever itself but not by the stroke of the clamping system.

The retaining element preferably comprises a holding section, at which it is held on the adjustment element so as to be arranged adjustably together with the adjustment element. For this purpose, the holding section of the retaining element is particularly preferably penetrated by the clamping pin, which, for its part, is arranged so as to be pivotable with the adjustment element. Accordingly, the retaining element moves together with the clamping pin in the pivoting direction or vertical direction when the adjustment element is adjusted in the vertical direction. This also ensures that the retaining element is always guided in a defined position relative to the locking lever, thus ensuring reliable engagement of the contact section of the clamping lever with the slotted guide contour of the retaining element in any possible pivoting position of the adjustment element.

The clamping lever preferably performs a rotary motion or a translational motion between the locking position and the open position, and therefore a very wide range of locking devices is compatible with the retaining element presented.

It is advantageous if the retaining element is designed as a springy sheet-metal part in order to achieve a simple and reliable design.

Preferred illustrative embodiments are described below with reference to the figures. Here, elements that are the same, similar or have the same action are denoted by identical reference signs. In order to avoid redundancies, repeated description of these elements is to some extent dispensed with in the following description.

A steering column 1 is shown in a schematic perspective view in FIG. 1. The steering column 1 comprises a holding element 10, which is designed in the form of a bracket and which can be fixed on the chassis of a motor vehicle by means of mounting apertures 12.

The holding element 10 furthermore comprises side cheeks 14, which extend downward in the assembled state and which accommodate between them an adjustment element 16 that can be adjusted in relation to the holding element 10. The adjustment element 16 is adjustable in a vertical direction Y and a longitudinal direction X in relation to the holding element 10. In a manner known per se, the adjustment element 16 supports a steering shaft 18, to which a steering wheel (not shown) can be attached. By means of an adjustment in the vertical direction Y, i.e. pivoting the adjustment element 16 about a pivoting axis (not shown here) arranged in the rear region of the adjustment element 16, a vertical adjustment of the steering wheel attached to the steering shaft 18 can be carried out in a corresponding manner. It is furthermore possible to move the adjustment element 16 in the longitudinal direction X, which corresponds to the direction of the axis of the steering shaft 18, in order to permit longitudinal adjustment of the position of the steering wheel.

Adjustment of the adjustment element 16 in the vertical direction Y and movement of the adjustment element 16 in the longitudinal direction X must be prevented at least during normal driving. For this purpose, a locking device 2 is provided, which can be seen in detail in FIG. 2 in a disassembled illustration. The locking device 2 comprises a clamping pin 20, which extends through a slotted hole 140, extending in the pivoting direction, in the side cheeks 14 of the holding element 10. The clamping pin 20 furthermore passes through holding lugs 160 of the adjustment element 16, wherein it is guided in such a way in a hole in the holding lugs 160 of the adjustment element that it is moved together with the adjustment element 16 during a movement of the adjustment element 16 in the vertical direction Y. The clamping pin 20 then moves along the slotted hole 140.

The clamping pin 20 is closed on one side thereof by means of a locknut 22. Provided on the other side is a cam mechanism comprising two wedging disks 24, which can be rotated relative to one another in order in this way to provide a clamping stroke.

The rotation of the wedging disks 24 relative to one another is brought about by means of a clamping lever 3, which is likewise mounted on the clamping pin 20 by means of a fixing nut 26. Pivoting of the clamping lever 3 from an open position to a locking position accordingly leads to a movement of the wedging disks 24 relative to one another and hence to a corresponding clamping stroke. This clamping stroke has the effect that the locknut 22 moves toward the interior of the wedging disks 24, with the result that the side cheeks 14 are moved toward one another by the clamping stroke produced in this way and accordingly clamp the adjustment element 16 in the position then existing. In principle, a clamping system of this kind is known from the prior art.

In order to ensure reliable locking of the adjustment element 16 in relation to the holding element 10, in the vertical direction Y in the example, in the event of a crash, a retaining element 4 is provided, which comprises a locking section 48, which in each case comprises a toothing 40 on two opposite sides extending in the vertical direction or in the direction of extent of the slotted hole 140. In the locking state of the locking device 2, the toothing 40 of the retaining element 4 enters into engagement with corresponding mating toothing 142, which is arranged in a fixed manner on the outside of the side cheek 14 facing the clamping lever 3, said outside facing the clamping lever 3. By means of the engagement of the toothing 40 of the retaining element 4 with the mating toothing 142, which is fixed on the side cheek 14, locking of the retaining element 4 with respect to the holding element 10 can be achieved.

In addition to the toothing 40 shown here and the mating toothing 142, any other shapes and geometries that allow form-fitting of the retaining element 4 to structures on the holding element 10 that are complementary thereto can be used.

The retaining element 4 furthermore comprises an attachment section 45, by means of which it is attached to the adjustment element 16. For this purpose, the attachment section 45 in the illustrative embodiment shown comprises an aperture 42, through which the clamping pin 20 attached to the adjustment element 16 passes. In corresponding fashion, the attachment section 45 of the retaining element 4 is likewise attached to the adjustment element 16 and moves with the latter, at least in the vertical direction Y.

In the illustrative embodiment shown, the aperture 42 of the attachment section 45 is configured in such a way that it simultaneously enters into engagement in a form-fitting manner with a form-fitting region of the wedging disk 24 resting directly thereon. Accordingly, the wedging disk 24 is held in a manner secure against rotation in the aperture 42 of the retaining element 4. The form-fitting region of the wedging disk 24 furthermore passes through the aperture 42 of the retaining element 4 and enters the slotted hole 140 in order in this way to provide security against rotation both for the retaining element 4 and for the wedging disk 24 itself in relation to the holding element 10.

Accordingly, the retaining element 4 provides retention of the clamping pin 20 in the direction of the slotted hole 140 when the toothing 40 of said retaining element is in form-fitting engagement with the mating toothing 142 on the side cheek 14, the retention being such that the adjustment element 16 held on the clamping pin 20 is also retained in the vertical direction Y.

In order to bring the retaining element 4 and, in particular, the toothing 40 into form-fitting engagement with the mating toothing 142, the retaining element 4 comprises a slotted guide contour 44, which comes into contact with a contact section 30 of the clamping lever, as shown in FIG. 4, for example.

In an appropriate rotational position of the clamping lever 3, in particular in the locked position of the clamping lever 3, the toothing 40 of the retaining element 4 enters into form-fitting engagement with the mating toothing 142 through the contact of the contact section 30 with the slotted guide contour 44 of the retaining element 4, wherein a preload in the direction of engagement of the form-fitting connection is applied to the retaining element 4. In the locked position of the clamping lever 3, the retaining element 4 thus has a preload, wherein this preload provides a return motion of the retaining element 4 out of the form-fitting connection as soon as the clamping lever 3 is transferred to the open position.

The contact section 30 of the clamping lever 3 is preferably provided only in an end region of the pivoting motion of the clamping lever 3 into the locking position. Once the clamping lever 3 is in the open position, however, as shown in FIG. 5, for example, the contact section 30 does not enter into engagement with the slotted guide contour 44 of the retaining element 4. Accordingly, there is also no pressing or preloading of the retaining element 4 into the locking position when the clamping lever 3 is in the open position.

From FIG. 5, it can furthermore be seen that the toothing 40 is then raised from the mating toothing 142, thus allowing height adjustment of the adjustment element 16 without hindrance by the retaining element 4.

In a variant embodiment which is not illustrated, the retaining element can still be slightly preloaded by the contact section in the open position of the clamping lever, wherein the form-fitting connection is not in engagement and hence adjustment of the adjustment element in relation to the holding element is enabled. Slight preloading of the retaining element reduces play of the clamping lever in the open position.

In a variant embodiment which is not illustrated, the clamping lever comprises one or more rolling elements, preferably a cylindrical roller or a ball, wherein this at least one rolling element forms the contact section of the clamping lever and interacts with the slotted guide contour of the retaining element.

In order to allow reliable release of the form-fitting connection, a springy section 46 is provided in the retaining element 4 in such a way that the toothing 40 rises from the mating toothing 142 when the contact section 30 of the clamping lever 3 is not in contact with the slotted guide contour 44 of the retaining element 4. In other words, the retaining element 4 springs out of the retaining position in the open position of the clamping lever 3 as shown, for example, in FIG. 5 and enables the adjusting motion of the adjustment element 16 in relation to the holding element 10.

In this case, the retaining element 4 comprises an attachment section 45, by means of which it is attached to the adjustment element 16. In the illustrative embodiment shown, the attachment section 45 comprises an aperture 42, which is penetrated by the clamping pin 20 for applying a clamping force in the locking position of the clamping lever 3.

The retaining element 4 furthermore comprises a locking section 48, which accommodates form-fitting elements, a toothing 40 in the illustrative embodiment shown, and which comprises the slotted guide contour 44 and is connected by means of a springy section 46 to the attachment section 45 attached to the adjustment element 16.

Accordingly, it is thus possible to form the retaining element 4 integrally as a sheet-metal part consisting of a springy metal, e.g. a spring steel, preferably as a stamped and bent part.

In this way, it is possible to ensure that, although the locking device 2 comprises a clamping mechanism, preferably a mechanism comprising wedging disks 24 or a cam mechanism, which acts on the attachment section 45 of the retaining element 4, a locking section 48 of the retaining element 4 is preloaded independently of the clamping mechanism via the contact of the contact section 30 of the clamping lever 3 with the slotted guide contour 44 in order to produce the form-fitting connection. In an advantageous manner, the slotted guide contour 44 can likewise be of springy design, allowing it to be preloaded by means of the contact section 30 of the clamping lever 3 and hence the possibility of production- and wear-related deviations can be compensated without counteracting the production of the form-fitting connection. The springy slotted guide contour 44 and the springy section 46 should be configured in such a way that the operation of the retaining element 4 is assured. The (clamping) stroke of the locking device 2 can be kept correspondingly small and has no effect on the operation of the retaining element 4.

The retaining element can also be used in a fully analogous way for retention in the longitudinal direction X. For this purpose, all that is required is to align the form-fitting elements, in particular the toothing systems, in the X direction.

A combination of two retaining elements, one for the vertical direction Y and one for the longitudinal direction X is also conceivable and possible.

FIG. 6 illustrates an alternative embodiment of the invention, which, as a departure from the embodiment illustrated in FIG. 2, comprises as a contact section a contact section 25 which interacts with the slotted guide contour 44, which is not arranged directly on the clamping lever 3 but on the wedging disk 24, which is connected for conjoint rotation to the clamping lever 3. The contact section 25 is thereby connected for conjoint rotation to the clamping lever 3. In order to bring the retaining element 4 and, in particular, the toothing 40 into form-fitting engagement with the mating toothing 142, the slotted guide contour 44 on the retaining element 4 is brought into contact with the contact section 25 during the rotation of the clamping lever 3 in a manner fully analogous with the illustration in FIG. 2.

Insofar as applicable, all the individual features which are illustrated in the individual illustrative embodiments can be combined with one another and/or interchanged without exceeding the scope of the invention.

LIST OF REFERENCE SIGNS 1 steering column
10 holding element
12 mounting aperture
14 side cheek
16 adjustment element
18 steering shaft
140 slotted hole
142 mating toothing
160 holding lug
2 locking device
20 clamping pin
22 locknut
24 wedging disk
25 contact section
26 fixing nut
3 clamping lever
30 contact section
4 retaining element
40 toothing
42 aperture
44 slotted guide contour
45 attachment section
46 springy section
48 locking section
X longitudinal direction
Y vertical direction

What is claimed is:

1. A steering column for a motor vehicle, the steering column comprising:
a holding element that is securable to a chassis of the motor vehicle;
an adjustment element that is adjustable relative to the holding element, the adjustment element for receiving a steering shaft;
a locking device that locks the adjustment element relative to the holding element, the locking device comprising a clamping lever that is movable between a locking position in which the adjustment element is locked with respect to the holding element and an open position in which the adjustment element is adjustable with respect to the holding element; and
a retaining element that provides a form-fitting connection between the holding element and the adjustment element in the locking position of the clamping lever, the retaining element comprising a slotted guide contour, which in the locking position of the clamping lever is supported against a stroke of the locking device on a contact section of the clamping lever or on a contact section connected for conjoint rotation to the clamping lever.

2. The steering column of claim 1 wherein the slotted guide contour is configured such that the retaining element is preloaded by contact with the contact section of the clamping lever to provide the form-fitting connection.

3. The steering column of claim 1 wherein the slotted guide contour is ramp-shaped so as to move the retaining element from an open position into a form-fitting position through contact with the contact section of the clamping lever.

4. The steering column of claim 1 wherein a toothing of the retaining element is engageable with a mating toothing of the holding element to form the form-fitting connection.

5. The steering column of claim 1 wherein the retaining element comprises an attachment section by way of which the retaining element is attached to the adjustment element, wherein the attachment section is penetrated by a clamping pin for applying a clamping force in the locking position of the clamping lever.

6. The steering column of claim 5 wherein the attachment section comprises an aperture that is penetrated by the clamping pin.

7. The steering column of claim 1 wherein the retaining element comprises a locking section that accommodates a form-fitting element, the locking section comprising the slotted guide contour and being connected by a springy section to an attachment section attached to the adjustment element.

8. The steering column of claim 7 wherein the form-fitting element is a toothing.

9. The steering column of claim 1 wherein the locking device comprises a clamping mechanism that acts on an attachment section of the retaining element, wherein a locking section of the retaining element is preloaded independently of the clamping mechanism by contact of the contact section of the clamping lever with the slotted guide contour to produce the form-fitting connection.

10. The steering column of claim 9 wherein the clamping mechanism comprises wedging disks or a cam mechanism.

11. The steering column of claim 1 wherein the clamping lever performs a rotary motion or a translational motion between the locking position and the open position.

12. The steering column of claim 1 wherein the retaining element is configured as a springy sheet-metal part.

13. The steering column of claim 1 wherein the retaining element comprises a springy section that preloads the retaining element out of the form-fitting connection.

14. A steering column for a motor vehicle, the steering column comprising:
a holding element that is securable to a chassis of the motor vehicle;
an adjustment element that is adjustable relative to the holding element, the adjustment element for receiving a steering shaft;
a locking device that locks the adjustment element relative to the holding element, the locking device comprising a clamping lever that is movable between a locking position in which the adjustment element is locked with respect to the holding element and an open position in which the adjustment element is adjustable with respect to the holding element; and a retaining element that is attached to the adjustment element and provides a connection between the holding element and the adjustment element in the locking position of the clamping lever, wherein in the locking position of the clamping lever the retaining element fixedly engages with the holding element or a structure secured to the holding element to prevent the adjustment element from moving relative to the holding element.

15. The steering column of claim 14 wherein in the locking position of the clamping lever toothing of the retaining element fixedly engages with mating toothing of or disposed on the holding element.

16. The steering column of claim 14 wherein the retaining element comprises a slotted guide contour that in the locking position of the clamping lever is supported against a stroke of the locking device on a contact section of the clamping lever or on a contact section connected for conjoint rotation to the clamping lever.

17. The steering column of claim 14 further comprising two wedging disks that are rotatable relative to one another, wherein rotation of the clamping lever causes rotation of two wedging disks relative to one another, which in turn causes a clamping stroke whereby the adjustment element is locked in place.

18. The steering column of claim 14 wherein the retaining element further comprises an attachment section with an aperture, wherein the attachment section is attached to the adjustment element and a clamping pin extends through the aperture of the attachment section of the retaining element.

19. The steering column of claim 14 further comprising two wedging disks that are rotatable relative to one another, wherein rotation of the clamping lever causes rotation of two wedging disks relative to one another, which in turn causes a clamping stroke whereby the adjustment element is locked in place, wherein the retaining element further comprises an attachment section with an aperture, wherein the attachment section is attached to the adjustment element and a clamping pin extends through the aperture of the attachment section of the retaining element, wherein the aperture of the attachment section is configured so as to receive in a form-fitting manner one of the wedging disks and secure that wedging disk against rotation in the aperture.

20. The steering column of claim 19 wherein a portion of the wedging disk that is received in the aperture of the attachment section of the retaining element extends through the aperture and into a slotted hole of the holding element through which the clamping pin also extends, wherein the portion of the wedging disk extending into the slotted hole of the holding element prevents the retaining element and the wedging disk received by the retaining element from rotating relative to the holding element.

* * * * *